United States Patent [19]

Hamada et al.

[11] Patent Number: 5,283,282

[45] Date of Patent: Feb. 1, 1994

[54] POLYAMIDE COMPOSITION

[75] Inventors: Tetsuo Hamada; Sadayuki Yakabe; Akira Ito, all of Nobeoka, Japan

[73] Assignee: Asahi Kasei Kogyo Kabushiki Kaisha, Osaka, Japan

[21] Appl. No.: 807,781

[22] Filed: Dec. 10, 1991

Related U.S. Application Data

[63] Continuation of Ser. No. 280,046, Dec. 5, 1988, abandoned.

[30] Foreign Application Priority Data

Dec. 8, 1987 [JP] Japan .................................. 62-308664
Apr. 21, 1988 [JP] Japan .................................. 63-96732

[51] Int. Cl.$^5$ ...................... C08L 25/10; C08L 71/12; C08L 77/00
[52] U.S. Cl. ...................... 525/92; 525/133; 525/166; 525/183; 525/184; 525/411; 525/413; 525/420; 525/425; 525/397
[58] Field of Search ............... 525/425, 411, 413, 420, 525/183, 184, 92, 133, 397

[56] References Cited

U.S. PATENT DOCUMENTS

| | | | |
|---|---|---|---|
| 3,647,761 | 3/1972 | Ridgway | 260/78 |
| 3,803,076 | 4/1974 | Schneider | 260/30.4 |
| 4,076,664 | 4/1974 | Schneider | 260/30.4 |
| 4,820,771 | 4/1989 | Müssig et al. | 525/425 |

Primary Examiner—Ana L. Carrillo
Attorney, Agent, or Firm—Armstrong, Westerman, Hattori, McLeland & Naughton

[57] ABSTRACT

A polyamide composition comprising an aromatic ring-containing polyamide resin and a specific amount of an aliphatic polyester. The composition has improved molding properties, such as mold release characteristics, and exhibits excellent physical properties, such as stiffness, which will not be lowered upon contact with moisture. The polyamide composition may contain additional components which have been used to improve properties other than molding properties, such as Izod impact strength and hinge effect properties, so that the effects of the components are also exerted in the present composition without sacrificing the main effect aimed at by the present invention, i.e., excellent molding properties. Therefore, the polyamide composition of the present invention is useful as a molding material in various fields, e.g., automobile, electrical and electronic industries.

7 Claims, 1 Drawing Sheet

POLYAMIDE COMPOSITION

This application is a continuation of application Ser. No. 280,046, filed Dec. 5, 1988, now abandoned.

BACKGROUND OF THE INVENTION

1. Field Of The Invention

The present invention relates to a polyamide composition. More particularly, the present invention is concerned with a polyamide composition comprising an aromatic ring-containing polyamide resin and a specific amount of an aliphatic polyester, which composition is extremely excellent in molding properties, particularly in mold release characteristics. The polyamide composition may contain additional components which have been used in polyamide compositions to improve properties other than molding properties, such as Izod impact strength and hinge effect properties, so that the effects of these additional components are also exerted in the present polyamide composition. The polyamide composition can advantageously be used as a material for shaped articles, such as a connector and a relay block in various fields, e.g., automobile, electrical and electronic industries.

2. Discussion Of Related Art

Aliphatic polyamides, for example nylon 6 and nylon 66 are now used in large quantities for a wide variety of usages, e.g., for preparing industrial parts, such as parts of automobiles, electrical and electronic devices and machines and also sporting goods and leisure goods, because aliphatic polyamides generally have excellent heat resistance, mechanical strength, toughness and molding properties. However, aliphatic polyamides are susceptible to moisture absorption due to their chemical structure. When aliphatic polyamides absorb moisture, not only are the aliphatic polyamides likely to undergo dimensional change to a large degree but also the stiffness of the aliphatic polymamides becomes low.

For overcoming the above-mentioned disadvantages, a method has been proposed in which a resin having low moisture absorption properties, such as polystyrene, is blended with a polyamide resin (see Japanese Patent Application Laid-open Specification No. 60-195157). However, although the stiffness of the blend obtained by the above-mentioned method is almost not lowered even upon contact with moisture, the blend is not satisfactory in heat resistance and molding properties.

In order to lower the moisture absorption of a polyamide resin, it has been proposed to introduce aromatic rings into a main chain of a polyamide resin (see Japanese Patent Application Laid-open Specification No. 58-120665). Indeed, an aromatic ring-containing polyamide resin prepared by this method exhibits excellent characteristics, such as heat resistance and stiffness, and only exhibits a small dimensional change and a small lowering of stiffness even upon contact with moisture. However, the aromatic ring-containing polyamide resin has a drawback in that when it is subjected to injection molding or compression molding, it is difficult to release the resultant molded article from the molds. For removing such a drawback, it has been attempted to increase the cooling time in the molding operation and also attempted to conduct molding while applying a mold release agent to a mold. However, these proposals are disadvantageous from the viewpoint of operational efficiency. Various other proposals have also been made for improving the molding properties of an aliphatic polyamide. In these proposals, a metal salt of a higher aliphatic carboxylic acid, such as calcium stearate, an aliphatic bisamide, or a higher aliphatic ester is incorporated in aliphatic polyamides (see Japanese Patent- Application Laid-open Specification Nos. 60-32845, 58-157855, 58-157856, 61-188458 and 62-232456). However, these proposals are not effective for improving the molding properties of the above-mentioned aromatic ring-containing polyamide resins.

U.S. Pat. No. 3,803,076 discloses a method for improving the molding properties of an aromatic ring-containing polyamide, in which a lactone having 3 to 9 carbon atoms is incorporated, as a mold release agent, in the polyamide. However, this method cannot provide an aromatic ring-containing polyamide with sufficiently improved molding properties. In addition, this method has a drawback in that since the lactone is liquid at room temperature, silver streaks are likely to appear on the surfaces of molded articles, particularly on the surfaces of portions of molded articles having small thickness, thereby leading to a remarkable lowering in commercial value of the molded articles. Further, the aromatic ring-containing polyamide having the above-mentioned lactone incorporated therein is likely to adhere to a hopper, so that additional measures must be employed for facilitating handling. For example, for incorporating the lactone as a mold release agent to the polyamide composition, it is necessary to introduce the liquid lactone by means of a gear pump or the like during pelletization of the polyamide composition. Therefore, this method is practically disadvantageous.

Heretofore, an aromatic ring-containing polyamide resin having not only excellent molding properties, such as mold release characteristics, but also being free from a lowering in physical properties upon contact with moisture has not yet been realized.

SUMMARY OF THE INVENTION

The present inventors have made extensive and intensive studies with a view toward developing a polyamide composition having not only excellent molding properties but also exhibiting excellent physical properties and dimensional stability which will not be lowered even upon contact with moisture. As a result, it has been found that this objective can be achieved by incorporating a specific amount of an aliphatic polyester into an aromatic ring-containing polyamide. It has also been found that a polyamide composition containing additional components conventionally used for improving properties other than molding properties is imparted with the favorable effects of these components without sacrificing the excellent molding properties. The present invention has been completed on the basis of these novel findings.

It is, therefore, an object of the present invention to provide a polyamide composition having improved molding properties, such as mold release characteristics and exhibiting excellent physical properties which are not lowered even upon contact with moisture.

The foregoing and other objects, features and advantages of the present invention will be apparent from the following detailed description and appended claims taken in connection with the accompanying drawings.

DETAILED DESCRIPTION OF THE INVENTION

Figure 1:
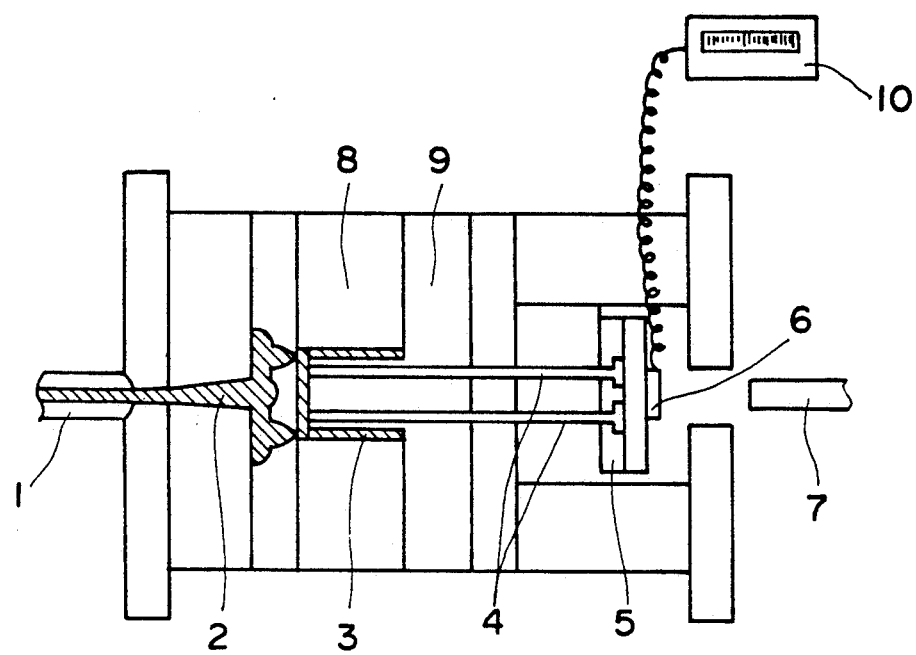
FIG. 1 is a diagrammatic view of a mold assembly provided with a mold release force measuring device for the evaluation of mold release characteristics.

According to the present invention, there is provided a polyamide composition comprising:

(A) 100 parts by weight of a polyamide resin consisting essentially of:
 (a-1) 50 to 100 % by weight, based on the total weight of components (a-1) and (a-2), of an aromatic ring-containing polyamide, and
 (a-2) 0 to 50% by weight, based on total weight of components (a-1) and (a-2), of an aliphatic polyamide;

(B) 0.05 to 10 parts by weight of an aliphatic polyester;

(C) 0 to 35 parts by weight of a copolymer component consisting essentially of:
 (c-1) 60 to 100% by weight, based on the total weight of components (c-1) and (c-2), of a carboxyl-containing ethylenic copolymer having pendant chains containing a carboxylic acid group and its metal salt, and
 (c-2) 0 to 40% by weight, based on the total weight of components (c-1) and (c-2), of a carboxyl-free hydrocarbon copolymer consisting essentially of carbon and hydrogen atoms;

(D) 0 to 10 parts by weight of a monomer component consisting essentially of:
 (d-1) 40 to 80% by weight, based on the total weight of components (d-1) and (d-2), of an oxide, a carbonate or a mixture thereof, and
 (d-2) 20 to 60% by weight, based on the total weight of components (d-1) and (d-2), of a polyhydric alcohol; and (E) 0 to 150 parts by weight of an aromatic polyether.

The polyamide resin (A) comprises an aromatic ring-containing polyamide (a-1) and optionally an aliphatic polyamide (a-2).

The aromatic ring-containing polyamide (a-1) is prepared by polymerizing an aromatic ring-containing monomer with an aromatic ring-free monomer in proportions such that the amount of the aromatic ring-containing monomer is from 0.1 to 0.6 mole per mole of all the monomers used for constituting the aromatic ring-containing polyamide (a-1). When the amount of the aromatic ring-containing monomer is less than 0.1 mole, the effect of the resultant aromatic ring-containing polyamide (a-1) is insufficient with respect to prevention of lowering of the physical properties of the polyamide composition upon contact with moisture. On the other hand, when the amount of the aromatic ring-containing monomer is more than 0.6 mole, the polyamide composition comprising the aromatic ring-containing polyamide (a-1) has an extremely high melt viscosity at the time of molding, so that the molding properties of the polyamide composition become poor.

Although the melting temperature of the aromatic ring-containing polyamide (a-1) is not specifically limited with respect to the improvement of mold release characteristics, the aromatic ring-containing polyamide (a-1) advantageously has a melting temperature of from 250° to 300° C., preferably 260° to 290° C. as measured by a differential scanning calorimeter.

When the aromatic ring-containing polyamide (a-1) has a melting temperature of less than 250° C., the polyamide composition comprising the aromatic ring-containing polyamide (a-1) has insufficient heat resistance. On the other hand, when the aromatic ring-containing polyamide (a-1) has a melting temperature of greater than 300° C., the temperature for molding the polyamide composition comprising the aromatic ring-containing polyamide (a-1) undesirably becomes close to the thermal decomposition temperature of the aromatic ring-containing polyamide (a-1).

Further, it is preferred that the heat of fusion of the aromatic ring-containing polyamide (a-1) calculated from the peak area of the thermogram obtained by means of a differential scanning calorimeter be not less than 2 cal/g. The aromatic ring-containing polyamide having a heat of fusion of 2 cal/g or more is crystalline, whereas the aromatic ring-containing polyamide having a heat of fusion of less than 2 cal/g is non-crystalline. The polyamide composition comprising the crystalline aromatic ring-containing polyamide is excellent in mold release characteristics and chemical resistance, as compared to the polyamide composition comprising the non-crystalline aromatic ring-containing polyamide.

Representative examples of aromatic ring-containing monomers for forming the aromatic ring-containing polyamide (a-1) to be used in the present invention include aromatic ring-containing diamines, such as metaxylylenediamine and paraxylylenediamine; aromatic ring-containing dicarboxylic acids, such as terephthalic acid, isophthalic acid, 2-methyl terephthalic acid and 2,5-dimethyl terephthalic acid; and aromatic ring-containing aminocarboxylic acids, such as paraaminobenzoic acid, paraaminomethylbenzoic acid and paraaminoethylbenzoic acid.

Representative examples of aromatic ring-free monomers for forming the aromatic ring-containing polyamide (a-1) include diamines, such as diaminobutane, hexamethylenediamine, 2-methyldiaminobutane, 2-methylpentamethylenediamine and 2,5-dimethylhexamethylenediamine; dicarboxylic acids, such as succinic acid, adipic acid, sebacic acid and dodecanedioic acid; lactams, such as ε-caprolactam and ω-laurolactam; and aminocarboxylic acids, such as 11-aminoundecanoic acid. The types and amounts of the above-mentioned aromatic ring-containing monomers and aromatic ring-free monomers are chosen so that the resultant aromatic ring-containing polyamide satisfies the above-mentioned requirements with respect to the aromatic ring content, the melting temperature and the heat of fusion.

Particularly preferred examples of aromatic ring-containing polyamides (a-1) include copolyamides containing hexamethylene terephthalamide units (6T) derived from hexamethylenediamine and terephthalic acid or its derivative. Representative examples of such copolyamides include copolymers comprised respectively of 6T/hexamethylene adipamide units (6T/66), 6T/hexamethylene isophthalamide units (6T/6I), 6T/hexamethylene adipamide units/ε-caprolactam units (6T/66/6), 6T/66/hexamethylene dodecanamide units (6T/66/612), 6T/66/hexamethylene sebacamide units (6T/66/610), 6T/66/tetramethylene adipamide units (6T/66/46), 6T/66/hexamethylene isophthalamide units (6T/66/6I), 6T/metaxylylene diamineadipamide units (6T/MXD-6) and 6T/66/MXD-6. The content of 6T in each of the above copolyamides is preferably in the range of from 20 to 60% by mole. When the 6T content is less than 20% by mole, it becomes difficult to obtain a polyamide composition which is excellent in physical properties, especially stiffness even upon contact with moisture. On the other hand, when the 6T content exceeds 60% by mole, the melting temperature and melt viscosity of the copolyamide are increased so that the moldability of the polyamide composition becomes poor, leading to a restriction in application of the polyamide composition.

In preparing the aromatic ring-containing polyamide (a-1) to be used in the present invention, there can be employed customary polymerization methods, such as melt polymerization, interfacial polymerization, solution polymerization, bulk polymerization and solid-state polymerization. Generally, melt polymerization or a combination of melt polymerization with solid-state polymerization is most appropriately used.

With respect to the molecular weight of the aromatic ring-containing polyamide (a-1), there is no particular limitation as long as it is moldable. However, it is preferred that the aromatic ring-containing polyamide (a-1) have a relative viscosity $\eta_r$ (as measured at 25° C. with respect to a solution obtained by dissolving 1 g of the aromatic ring-containing polyamide in 100 ml of 95.5% sulfuric acid) of 1.6 or more, from the viewpoint of obtaining a polyamide composition having desirable properties. The relative viscosity $\eta_r$ is preferably in the range of from 1.6 to 3.5, more preferably 1.7 to 2.6. When it is greater than 3.5, the melt viscosity of the ultimate polyamide composition becomes too high, thereby causing the molding methods of the composition to be limited.

The above-mentioned aromatic ring-containing polyamides (a-1) may be used individually or in combination.

As mentioned above, the polyamide resin (A) (optionally contains an aliphatic polyamide (a-2) in addition to the aromatic ring-containing polyamide (a-1). The aromatic ring-containing polyamide (a-1) is present in an amount of from 50 to 100% by weight, based on the total weight of components (a-1) and (a-2). On the other hand, the amount of the aliphatic polyamide (a-2) is in the range of from 0 to 50% by weight, preferably from 3 to 50% by weight, more preferably from 3 to 30% by weight, based on the total weight of components (a-1) and (a-2).

As described above, the aliphatic polyamide (a-2) is not an essential component in the polyamide resin (A) of the present invention. However, the addition of the aliphatic polyamide (a-2) in the above-mentioned amount gives not only an excellent balance of physical properties but also excellent molding properties. When the aliphatic polyamide (a-2) is added in an amount of more than 50% by weight, based on the total weight of components (a-1) and (a-2), the physical properties of the polyamide composition are disadvantageously lowered by moisture absorption.

Representative examples of aliphatic polyamides include nylon 66, nylon 6, nylon 69, nylon 610, nylon 612, nylon 46, nylon 11 and nylon 12. There is no particular restriction with respect to the molecular weight of the aliphatic polyamide (a-2). However, in order to exert the effect aimed at by the addition of the aliphatic polyamide (a-2), the aliphatic polyamide preferably has a relative viscosity $\eta_r$ of 2.3 or more, preferably 3.0 or more (as measured at 25° C. with respect to a solution obtained by dissolving 1 g of the aliphatic polyamide in 100 ml of 95.5% sulfuric acid). The above-mentioned aliphatic polyamides (a-2) may be used individually or in combination.

In the polyamide composition of the present invention, it is required that an aliphatic polyester (B) be contained in an amount of from 0.05 to 10 parts by weight per 100 parts by weight of the polyamide resin (A).

The incorporation of the above-mentioned aliphatic polyester (B) leads to remarkable improvements in moldability, particularly in mold release characteristics, in preparing a molded article of a complicated structure having portions largely differing in thickness, such as a connector. The amount of the aliphatic polyester (B) to be incorporated varies depending on the shape of a molded article, but is generally in the range of from 0.05 to 10 parts by weight per 100 parts by weight of the polyamide resin (A) as mentioned above. When the amount of the aliphatic polyester (B) is less than 0.05 part by weight, the improvement of moldability is not sufficient. On the other hand, when the amount exceeds 10 parts by weight, not only is a further additional improvement in moldability not attained but also the stiffness of the ultimate molded article is lowered. A particularly preferable amount is in the range of from 0.5 to 3 parts by weight per 100 parts by weight of the polyamide resin (A).

Representative examples of aliphatic polyesters (B) include condensation polymerization products of aliphatic dicarboxylic acids, such as succinic acid, glutaric acid, adipic acid, sebacic acid, pimelic acid, suberic acid, azelaic acid and dodecandioic acid, and aliphatic diols, such as ethylene glycol, 1,2-propylene glycol, 1,4-butanediol, neopentyl glycol, 1,6-hexanediol, 1,4-cyclohexanedimethanol and 3-methyl-1,5-pentanediol; and ring opening polymerization products of lactones, such as β-propiolactone, γ-butyrolactone, γ-valerolactone, ε-caprolactone and γ-caprolactone. Preferred examples of aliphatic polyesters include polybutylene adipate, polypropylene sebacate, polybutylene sebacate and polycaprolactone. These aliphatic polyesters can be used individually or in combination.

The number average molecular weight of these polyesters varies depending on the types of the polyesters, but is generally at least 2,000. The molecular weight is preferably not smaller than 4,000, more preferably not smaller than 10,000, from the viewpoints of good mold release characteristics and prevention of gas formation during molding and volatilization from a molded article. The number average molecular weight is calculated from the number of the molecules of the aliphatic polyester determined by quantitative analysis of the terminal hydroxyl groups in accordance with JIS-K1557. With respect to polyesters having a molecular weight of 10,000 or more, the number average molecular weight is determined by gel permeation chromatography (GPC) employing a curve prepared using a standard polystyrene as a calibration curve for the GPC, because if the number average molecular weight of the polyesters is determined by quantitative analysis of the terminal hydroxyl groups, the obtained results become inaccurate. There is no particular restriction with respect to the upper limit of the number average molecular weight of these polyesters, but the upper limit is generally 70,000 to 100,000.

Thus, according to the present invention, by the combination of the aromatic ring-containing polyamide (A) and the aliphatic polyester (B), there is obtained a polyamide composition that is characterized by remarkably improved molding properties and by excellent physical properties which will not be lowered even upon contact with moisture. Moreover, in the polyamide composition of the present invention, additional components (C), (D) and/or (E) described hereinbelow may optionally be added to the composition of the aromatic ring-containing polyamide (A) and aliphatic polyester (B). These components (C), (D) and (E) have conventionally been used to improve properties of polyamide composition other than the above-mentioned properties, such as impact strength and hinge effect properties. The effects of these components are also exerted in the composition of the present invention without sacrificing the main effect aimed at by the present invention, i.e., excellent molding properties. That is, by incorporating a copolymer component (C), a monomer component (D) and an aromatic polyether (E), the impact resistance and hinge effect properties and low moisture absorption properties of the polyamide composition can be further improved.

The copolymer component (C) consists essentially of a carboxyl-containing ethylenic copolymer having pendant chains containing a carboxylic acid group and its metal salt (c-1) and optionally a carboxyl-free hydrocarbon copolymer consisting essentially of carbon and hydrogen atoms (c-2).

The above-mentioned carboxyl-containing ethylenic copolymer having pendant chains containing a carboxylic acid group and its metal salt (c-1) is defined as a copolymer containing monomer units respectively represented by the formulae:

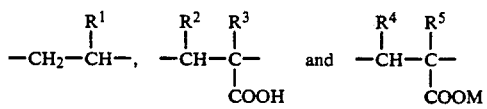

wherein each of $R^1$, $R^2$, $R^3$, $R^4$ and $R^5$ independently represents a hydrogen atom or an alkyl group having 1 to 5 carbon atoms; and M is an ion of a metal of group Ia, Ib, IIa, IIb or IIIa in the periodic table.

Representative examples of the above-mentioned metals include Na, K, Cu, Mg, Zn and Al. When the metal is polyvalent, it cooperates with the corresponding number of carboxylic acid groups to form a salt.

The carboxyl-containing ethylenic copolymer (c-1) may contain unsaturated carboxylate units in the pendant chains, in addition to the monomer units of the formulae shown above, as long as the ratio of the number of the unsaturated carboxylate units to the total number of the unsaturated carboxylate units, monomer units having pendant chains containing a carboxylic acid group and monomer units having pendant chains containing a carboxylic acid metal salt, is 0.6 or less. The unsaturated carboxylate units are defined as units derived from alkyl (having 1 to 4 carbon atoms) esters of unsaturated carboxylic acids having 3 to 8 carbon atoms, such as acrylic acid, methacrylic acid and ethacrylic acid. Representative examples of alkyl esters of unsaturated carboxylic acids include methyl acrylate, ethyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate and isobutyl ethacrylate.

Typical examples of the carboxyl-containing ethylenic copolymer (c-1) are copolymers known as ionomer resins.

The amount of component (c-1) is in the range of from 60 to 100% by weight, preferably in the range of from 60 to 85% by weight, based on the total weight of components (c-1) and (c-2).

Representative examples of carboxyl-free hydrocarbon copolymers (c-2) include ethylenic copolymers, such as an ethylene-propylene copolymer, an ethylene-butene-1 copolymer, an ethylene-hexene-1 copolymer and an ethylene-propylene-ethylidene norbornene copolymer; and a hydrogenated polybutadiene and a hydrogenated styrene-butadiene block copolymer each having a hydrogenation degree of at least 80%.

The amount of component (c-2) is in the range of from 0 to 40% by weight, preferably in the range of from 15 to 40% by weight, based on the total weight of components (c-1) and (c-2). If the amount of component (c-2) exceeds 40% by weight, the dispersion of components (c-1) and (c-2) in the polyamide resin (A) becomes non-uniform probably due to phase separation, leading to a lowering in properties, such as impact resistance.

Component (C) is used in an amount in the range of from 0 to 35 parts by weight, preferably 3 to 35 parts by weight, per 100 parts by weight of the polyamide resin (A). If the amount of component (C) exceeds 35 parts by weight, the stiffness and heat resistance of the polyamide composition will be unfavorably lowered.

The melt index (MI) values of components (c-1) and (c-2) are in the range of from 0.1 to 5 and in the range of from 1 to 10, respectively, as measured in accordance with ASTM-D1238.

Component (c-2) serves to promote dispersion of component (c-1) in the polyamide resin (A).

Incorporation of component (C) brings about improvement in impact resistance and hinge effect properties even if its amount is small. The term "hinge effect properties" used herein means flexural fatigue strength at a thin portion of a molded article, which is measured in terms of the number of flexings until the article is broken at its thin portion.

Monomer component (D) consists essentially of an oxide, a carbonate or a mixture thereof (d-1); and a polyhydric alcohol (d-2).

Component (d-1) is at least one member selected from an oxide and a carbonate which are represented by the formula:

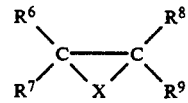

wherein each of $R^6$, $R^7$, $R^8$ and $R^9$ independently represents a hydrogen atom or an alkyl group having 1 to 3 carbon atoms; and X represents

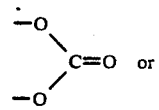

an oxygen atom.

Representative examples of component (d-1) include ethylene carbonate, ethylene oxide, propylene oxide and butylene oxide.

The amount of component (d-1) is in the range of from 40 to 80% by weight, based on the total weight of components (d-1) and (d-2).

Component (D) is used in an amount of from 0 to 10 parts by weight, preferably from 0.2 to 10 parts by weight, more preferably from 0.2 to 5 parts by weight per 100 parts by weight of the polyamide resin (A). When component (D) is used in the above-mentioned amount, the hinge effect properties of the composition are further improved and, hence, component (D) is optionally employed depending on the intended use of the composition.

The reason why the incorporation of component (D) contributes to an improvement in the hinge effect properties has not yet been clearly elucidated. However, it is believed that a reaction occurs between component (d-1) and component (c-1) in the presence of component (d-2), which reaction results in strengthening the bonding between component (c-1) and the polyamide matrix.

If the amount of component (D) exceeds 10 parts by weight, heat resistance is disadvantageously lowered, although the effect of improving the hinge effect properties is increased.

Representative examples of component (d-2) include ethylene glycol, trimethylene glycol, butanediol, diethylene glycol, glycerin and pentaerythritol. The amount of component (d-2) is in the range of from 20 to 60% by weight, based on the total weight of components (d-1) and (d-2). Component (d-2) not only acts as a plasticizer, but also exhibits an effect of further improving the hinge effect properties of a molded article in the presence of component (d-1).

The aromatic polyether (E) can be used in the polyamide composition of the present invention in order to further lower the moisture absorption of the polyamide composition.

The aromatic polyether (E) can be an aromatic polyether resin which is a homopolymer comprised of the following recurring units represented by the formula (I) or a copolymer comprised of the following recurring units represented by the formulae (I) and (II):

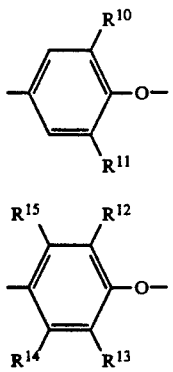

wherein each of $R^{10}$, $R^{11}$, $R^{12}$, $R^{13}$, $R^{14}$ and $R^{15}$ independently represents a monovalent residue selected from the group consisting of an alkyl group having 1 to 4 carbon atoms other than a tert-butyl group, an aryl group, a halogen atom and a hydrogen atom; with the proviso that $R^{14}$ and $R^{15}$ are not hydrogen atoms simultaneously.

The aromatic polyether (E) can also be a graft copolymer obtained by graft-polymerizing a monomer, such as styrene, with the above-mentioned homopolymer or copolymer.

Representative examples of aromatic polyethers (E) include polyphenylene ether homopolymers, such as poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether and poly(2-methyl-6-chloroethyl-1,4-phenylene)ether.

The aromatic polyether (E) can further be a polyphenylene ether copolymer comprised mainly of a polyphenylene ether as obtained by copolymerizing a monomer represented by the formula:

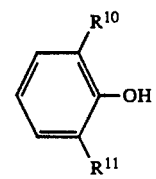

wherein $R^{10}$ and $R^{11}$ have the same meanings as defined above, with o-cresol or with an alkyl-substituted phenol, such as 2,3,6-trimethyl phenol represented by the formula:

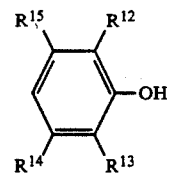

wherein $R^{12}$, $R^{13}$, $R^{14}$ and $R^{15}$ have the same meanings as defined above.

Still further, the aromatic polyether (E) can be a graft copolymer obtained by graft-copolymerizing at least 50% by weight of the above-mentioned polyphenylene ether with not greater than 50% by weight of a styrene monomer or a combination of a styrene monomer and a monomer which is copolymerizable with styrene. The above-mentioned percentages are based on the total weight of the polyphenylene ether and the monomer component. When the content of the monomer component exceeds 50% by weight, the heat deformation temperature of the polyamide composition becomes low.

A particularly preferred aromatic polyether is poly(2,6-dimethylphenylene-1,4-ether). This aromatic polyether can be produced, for example, by a method in which 2,6-dimethylphenol is subjected to oxidative polymerization using oxygen or an oxygen-containing gas, in the presence of a catalyst for oxidative coupling polymerization, such as a combination of pyridine or a tertiary amine, such as an N-alkyl cyclic amine, with a cuprous salt, such as cuprous chloride or cuprous bromide.

The aromatic polyether (E) to be used in the present invention has a molecular weight such that the reduced viscosity [ηsp/c] of the aromatic polyether is in the range of from 0.4 to 0.7, as measured at 25° C. in chloroform.

The amount of the aromatic polyether (E) is in the range of from 0 to 150 parts by weight, preferably 5 to 150 parts by weight per 100 parts by weight of the polyamide resin (A). The polyamide composition of the present invention in which an aromatic polyether is incorporated has a morphology in which the polyamide resin (A) forms a "sea phase" and the aromatic polyether (E) forms an "island phase". This morphology contributes to the chemical resistance of the polyamide composition. When the amount of the aromatic polyether (E) is greater than 150 parts by weight, the aromatic polyether (E) forms a "sea phase" and the polyamide resin (A) forms an "island phase". Therefore, the above-mentioned desired morphology cannot be attained, leading to a poor chemical resistance of the polyamide composition.

The effect of the aromatic polyether (E) is advantageously exerted, when the amount of the aliphatic polyamide (a-2) is in the range of from 0 to 50% by weight, based on the weight of the polyamide resin (A). When the amount exceeds 50% by weight, the effect of the aromatic polyether (E) is not exerted, that is, a lowering of the flexural modulus of elasticity upon contact with moisture cannot be effectively prevented.

In the polyamide composition of the present invention, a nucleator for crystallization may be employed in order to further improve mold release characteristics. The use of the nucleator is particularly effective in a composition where component (C) is used. As the nucleator, there can be employed any of the customary inorganic and organic nucleators. Representative examples of nucleators include titanium oxide, sodium phosphate, sodium phenylphosphonate, sodium phenylphosphinate, talc, calcium stearate, sodium stearate and melamine cyanurate. The nucleator that is the most effective per unit weight is talc. The amount of the nucleator to be added varies depending or the type of nucleator, but is preferably 1 part by weight or less per 100 parts by weight of polyamide resin (A) from the viewpoint of preventing an adverse effect on the properties of the polyamide composition.

The preparation of the polyamide composition of the present invention can be performed by a customary method for preparing a resin composition. For example, there may be employed a method in which an aromatic ring-containing polyamide, an aliphatic polyester and, if desired, other components (C), (D) and/or (E) are premixed and then subjected to melt kneading in an extruder, followed by cooling and pelletizing. However, the method for preparing the present polyamide composition is by no means restricted to the above-mentioned method.

In the polyamide composition of the present invention, there can be employed various additives which are commonly used for a polyamide, such as heat stabilizers, antioxidants, lubricants, plasticizers, fire retardants, antistatic agents, colorants, reinforcing materials, e.g., glass fibers and inorganic fillers such as wollastonite, mica and calcined kaolin, and other polymer resins as long as the properties of the present invention are not adversely affected.

The polyamide composition of the present invention has not only excellent mold release characteristics but also provides an ultimate article exhibiting excellent properties, such as stiffness, which will not be lowered even upon contact with moisture. Moreover, the polyamide composition of the present invention has excellent mechanical strength, such as impact resistance, and heat resistance. Therefore, the polyamide composition of the present invention is useful as a molding material in various fields, e.g., automobile, electrical and electronic industries. In particular, the present polyamide composition is useful as a molding material for a connector which is required to have excellent molding properties.

DETAILED DESCRIPTION OF THE PREFERRED EMBODIMENTS

The present invention will now be described in more detail with reference to the following Examples that by no means limit the scope of the invention.

In the following Examples and Comparative Examples, the properties of polyamides and compositions were determined in accordance with the following methods.

(1) Melting Temperature and Heat of Fusion

A polymer pellet sample having a thickness of about 0.2 mm to about 0.5 mm (about 10 mg) is subjected to differential scanning calorimetry (DSC) using a differential scanning calorimeter (model DSC-1B manufactured and sold by Perkin Elmer Co., U.S.A.). In the differential scanning calorimetry, the sample is heated at a temperature elevation rate of 16° C./min in a nitrogen gas atmosphere. As a result, a DSC chart is obtained. The melting temperature of the polymer is determined as a temperature corresponding to the temperature of the peak point of the endothermic peak. On the other hand, the heat of fusion of the polymer is determined from the area defined by the endothermic peak. With respect to the measurements of melting temperature and heat of fusion, a combination of indium and lead, and indium are employed as standard samples, respectively.

(2) $\eta_r$ (relative viscosity with respect to sulfuric acid)

1 g of a polymer is dissolved in 100 ml of 95.5% sulfuric acid. The viscosity ($\eta_r$) of the resultant solution is measured at 25° C. using an Ostwald's viscometer.

(3) Preparation of Dry and Wet Samples

A molded polymer composition sample is allowed to stand in a desiccator at 23° C. for 24 hours, thereby obtaining a dry sample.

The dry sample is immersed in hot water (80° C.) for 8 hours and then in 23° C. water for 16 hours, taken out and allowed to stand for 48 hours in a thermostatic chamber conditioned so as to have a constant temperature of 23° C. and a relative humidity of 50%. Thus, a wet sample is obtained.

Using the dry samples and wet samples, various properties, such as flexural strength, flexural modulus of elasticity, tensile strength at yield, tensile elongation at break and Izod impact strength are measured.

(4) Moisture Content

The weight ($W_D$) of a dry sample as mentioned in item (3) above is measured, and also the weight ($W_W$) of the wet sample obtained therefrom as mentioned in item (3) above is measured.

The moisture content of the polymer composition is calculated according to the following formula:

$$\text{Moisture content (\%)} = \frac{W_W - W_D}{W_D} \times 100.$$

(5) Tensile Strength at Yield and Tensile Elongation at Break

These are measured in accordance with ASTM D638.

(6) Flexural Strength and Flexural Modulus of Elasticity

These are measured in accordance with ASTM D790.

(7) Izod Impact Strength (notched)

The Izod impact strength at 23° C. for a notched sample is measured in accordance with ASTM D256.

(8) Mold Release Characteristics

Injection molding of a polymer composition is performed using a mold assembly as shown in FIG. 1, which is provided with a mold release force measuring device. In FIG. 1, a melted resin is injected from a cylinder (not shown) through nozzle 1 to form sprue runner 2, and then enters a cavity defined by female mold 8 and core 9 (male mold), the cavity having a cup shape. The mold assembly is then cooled. After cooled for a predetermined period of time, the mold assembly is opened, at the time of which molded article (cup-shaped) 3 is separated from sprue runner 2. The mold assembly is then further opened to move the right-hand entire portion including female mold 8 and core 9 in a right-hand direction. Pressure sensor 6 is brought into contact with the end of knockout rod 7, so that ejector plate 5 having ejector pins 4 is pressed in a left-hand direction. Molded article 3 is released from female mold 8 and core 9 by the action of ejector pins 4. The mold release force is automatically measured and recorded in mold release force recorder 10. Injection molding is performed under the conditions set forth below, and the mold release forces with respect to the molded samples obtained by the 31st through 35th injection shots are averaged. The resultant average value is taken as a release force of the polymer composition.

Conditions of Injection Molding

Injection molding machine: Model IS-90B manufactured and sold by Toshiba Machine Co., Ltd.
Mold: for forming cup-shaped article (one-cavity mold); the mold is designed to produce a cup-shaped article having an upper outside diameter of 50 mm, an upper inside diameter of 43.7 mm, a lower outside diameter of 50 mm and a lower inside diameter of 47 mm.
Nozzle temperature: 285° C.
Cylinder temperature: front portion-280° C., and middle portion-280° C.
Mold temperature: 40° C.
Injection pressure: 400 kg/cm$^2$
Injection time: 4 sec
Cooling time: 10 sec (9) Moldability at Continuous Connector Production The above moldability is evaluated by determining the minimum cooling time at which 100 injection shots can be continuously performed stably for producing the connector article diagrammatically shown in FIG. 2. The shorter the minimum cooling time, the better the moldability. The term "stably" is determined by the following criteria:

(1) the molded article must be completely released from the mold assembly, that is,
 (a) the entire body of the desired molded article is produced in the desired form, and
 (b) the molded article is completely released from the mold by the action of the ejector pins;

(2) the molded article must not be deformed, that is,
 (a) not deformed under the influence of the ejector pins, and
 (b) not deformed during the release from the mold.

Figures 2A, 2B:
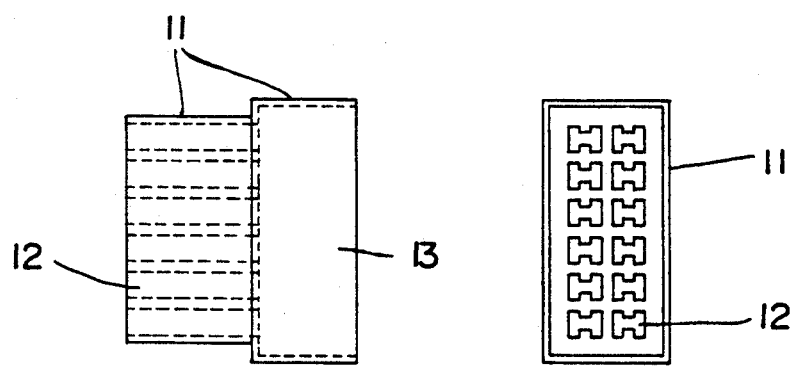
FIG. 2(A) is a diagrammatic side view of a connector produced in the Examples and Comparative Examples for the evaluation of moldability of a polyamide composition at continuous connector production.
FIG. 2(B) is a diagrammatic plan view of the connector shown in FIG. 2(A) as viewed on the right side of FIG. 2(A).

FIG. 2(A) is a side view of the connector article, and FIG. 2(B) is a plan view of the article as viewed on the right side of FIG. 2(A). In FIG. 2(A) and 2(B), housing 11 comprises recess portion 13 and a leg portion extending from the bottom of recess portion 13. The leg portion has a plurality of apertures for fittedly receiving male terminals therein.

(10) Hinge Effect Properties

A test specimen having a small-thickness portion of 0.6 mm in thickness is subjected to flexing conducted at a maximum flex angle of 150°, at a rate of 30 flexings per minute and in an atmosphere of −30° C. The flexing is continued until breakage of the specimen occurs, and the number of flexings at which the breakage has occurred is counted.

(11) Heat Distortion Temperature

This is measured in accordance with ASTM D648.

(12) Moldability into A Small Thickness

This is evaluated on the basis of the flow length of a polymer composition which is measured using a mold having a width of 8 mm and a thickness of 0.4 mm, the mold having a cavity formed of a plurality of -shaped sub-cavities continuously connected. Mold release characteristics are also measured for evaluating the moldability.

Referential Example 1

An equimolar salt (6T salt) of hexamethylenediamine and terephthalic acid and an equimolar salt (66 salt) of hexamethylenediamine and adipic acid were charged into a reaction vessel in a molar ratio of the former salt to the latter salt of 40/60, and to the resultant salt mixture was added demineralized water to prepare an aqueous 6T/66 salts solution having a 6T/66 salts content of 40% by weight. The aqueous solution was charged into an autoclave and concentrated at 135° C. to increase the 6T/66 salts content to 70% by weight. The resultant aqueous solution was heated at a temperature of 310° C. under a pressure of 17.5 kg/cm$^2$ for 2 hours so as to effect melt polymerization. Thus, there was obtained a copolyamide consisting essentially of hexamethylene terephthalamide units (referred to as "6T" in the Tables) and hexamethylene adipamide units (referred to as "66" in the Tables) in a molar ratio of the former units to the latter units of 40/60 and having a relative viscosity ($\eta_r$) of 2.3 with respect to 95.5% sulfuric acid. The melting temperature of the copolyamide was 285° C., and the heat of fusion of the copolyamide was 13 cal/g.

Referential Example 2

An equimolar salt (6T salt) of hexamethylenediamine and terephthalic acid and an equimolar salt (6I salt) of hexamethylenediamine and isophthalic acid were charged into a reaction vessel in a molar ratio of the former salt to the latter salt of 50/50, and to the resultant salt mixture was added demineralized water to prepare an aqueous 6T/6I salts solution having a 6T/6I salts content of 40% by weight. The aqueous solution was charged into an autoclave and concentrated at 135° C. to increase the 6T/6I salts content to 70% by weight. The resultant aqueous solution was heated at a temperature of 310° C. under a pressure of 17.5 kg/cm$^2$ for 2 hours so as to effect melt polymerization. Thus, there was obtained a copolyamide consisting essentially of hexamethylene terephthalamide units and hexamethylene isophthalamide units (referred to as "6I" in the Tables) in a molar ratio of the former units to the latter units of 50/50 and having a relative viscosity ($\eta_r$) of 2.1 with respect to 95.5% sulfuric acid. The melting temperature of the copolyamide was 289° C., and the heat of fusion of the copolyamide was 3 cal/g.

Referential Example 3

An equimolar salt (6T salt) of hexamethylenediamine and terephthalic acid, an equimolar salt (66 salt) of hexamethylenediamine and adipic acid and an equimolar salt (612 salt) of hexamethylenediamine and dodecanedioic acid were charged into a reaction vessel in molar proportions of 40:55:5, respectively, and to the resultant salt mixture was added demineralized water to prepare an aqueous 6T/66/612 salts solution having a 6T/66/612 salts content of 40% by weight. The aqueous solution was charged into an autoclave and concentrated at 135° C. to increase the 6T/66/612 salts content to 70% by weight. The resultant aqueous solution was heated at a temperature of 310° C. under a pressure of 17.5 kg/cm² for 2 hours so as to effect melt polymerization. Thus, there was obtained a copolyamide consisting essentially of hexamethylene terephthalamide units, hexamethylene adipamide units and hexamethylene dodecanamide units (referred to as "612" in the Tables) in molar proportions of 40:55:5, respectively and having a relative viscosity ($\eta_r$) of 2.4 with respect to 95.5% sulfuric acid. The melting temperature of the copolyamide was 273° C., and the heat of fusion of the copolyamide was 7 cal/g.

Referential Example 4

An equimolar salt (6T salt) of hexamethylenediamine and terephthalic acid, an equimolar salt (66 salt) of hexamethylenediamine and adipic acid and an equimolar salt (612 salt) of hexamethylenediamine and dodecanedioic acid were charged into a reaction vessel in molar proportions of 45:40:15, respectively, and to the resultant salt mixture was added demineralized water to prepare an aqueous T/66/612 salts solution having a 6T/66/612 salts content of 40% by weight. The aqueous solution was charged into an autoclave and concentrated at 135° C. to increase the 6T/66/612 salts content to 70% by weight. The resultant aqueous solution was heated at a temperature of 310° C. under a pressure of 7.5 kg/cm² for 2 hours so as to effect melt polymerization. Thus, there was obtained a copolyamide consisting essentially of hexamethylene terephthalamide units, hexamethylene adipamide units and hexamethylene dodecanamide units in molar proportions of 45:40:15, respectively and having a relative viscosity ($\eta_r$) of 2.4 with respect to 95.5% sulfuric acid. The melting temperature of the copolyamide was 284° C., and the heat of fusion of the copolyamide was 5 cal/g.

Referential Example 5

A copolyamide consisting essentially of hexamethylene terephthalamide units and hexamethylene adipamide units in a molar ratio of the former units to the latter units of 40/60 and having a relative viscosity ($\eta_r$) of 1.8 with respect to 95.5% sulfuric acid was obtained according to substantially the same procedure as described in Referential Example 1, except that prior to polymerization, acetic acid was added to the salt mixture in an amount of 1.5 mole %, based on the moles of the whole mixture. The copolyamide was subjected to solid-state polymerization, i.e. heated at 200° C. for 4 hours, to thereby obtain a further polymerized copolymer having a relative viscosity of 2.2 with respect to 95.5% sulfuric acid. The melting temperature of the copolyamide was 285° C., and the heat of fusion of the copolyamide was 13 cal/g.

Referential Example 6

The copolyamide having a relative viscosity ($\eta_r$) of 1.8 with respect to 95.5% sulfuric acid as obtained in Referential Example 5 was blended in molten state with a nylon 66 having a relative viscosity ($\eta_r$) of 3.5 with respect to 95.5% sulfuric acid in a molar ratio of the former polymer to the latter polymer of 90/10, followed by a solid-state polymerization, i.e. heating at 200° C. for 4 hours. Thus, a copolyamide having a relative viscosity ($\eta_r$) of 2.3 with respect to 95.5% sulfuric acid was obtained. The melting temperature of the copolyamide was 278° C., and the heat of fusion of the copolyamide was 14 cal/g.

Referential Example 7

A copolyamide consisting essentially of hexamethylene terephthalamide units and hexamethylene adipamide units and having a relative viscosity ($\eta_r$) of 2.5 with respect to 95.5% sulfuric acid was obtained according to substantially the same procedure as described in Referential Example 1, except that an equimolar mixture of hexamethylenediamine with dimethyl terephthalate was used in place of an equimolar salt of hexamethylenediamine and terephthalic acid. The melting temperature of the copolyamide was 285° C., and the heat of fusion of the copolyamide was 13 cal/g.

Referential Example 8

A copolyamide consisting essentially of hexamethylene terephthalamide units, hexamethylene isophthalamide units and hexamethylene adipamide units in molar proportions of 35:5:60, respectively and having a relative viscosity ($\eta_r$) of 2.2 with respect to 95.5% sulfuric acid was obtained according to substantially the same procedure as described in Referential Example 1, except that a mixture consisting of 35 mole % of an equimolar salt of hexamethylenediamine and terephthalic acid and 5 mole % of an equimolar salt of hexamethylenediamine and isophthalic acid was used in place of 40 mole % of an equimolar salt of hexamethylenediamine and terephthalic acid. The melting temperature of the copolyamide was 265° C., and the heat of fusion of the copolyamide was 6 cal/g.

Referential Example 9

A copolyamide consisting essentially of hexamethylene terephthalamide units, hexamethylene adipamide units and hexamethylene dodecanamide units in molar proportions of 35:60:5, respectively and having a relative viscosity ($\eta_r$) of 2.1 with respect to 95.5% sulfuric acid was obtained according to substantially the same procedure as described in Referential Example 8, except that an equimolar salt of hexamethylenediamine and dodecanedioic acid was used in place of an equimolar salt of hexamethylenediamine and isophthalic acid. The melting temperature of the copolyamide was 265° C., and the heat of fusion of the copolyamide was 9 cal/g.

Referential Example 10

A (40:55:5 in molar proportion) mixture of an equimolar salt of hexamethylediamine and terephthalic acid, an equimolar salt of hexamethylenediamine and adipic acid and a polyhexamethylene adipamide (nylon 66) having a relative viscosity ($\eta_r$) of 3.0 with respect to 95.5% sulfuric acid was subjected to polymerization reaction under substantially the same conditions as in Referential Example 1, thereby obtaining a copolyamide composed of hexamethylene terephthalamide units and hexamethylene adipamide units in a molar ratio of the former units to the latter units of 40/60 and having a relative viscosity ($\eta_r$) of 2.2 with respect to 95.5% sulfuric acid. The melting temperature of the copolyamide was 284° C., and the heat of fusion of the copolyamide was 13 cal/g.

Referential Example 11

80 Parts by weight of a copolyamide composed of hexamethylene terephthalamide units and hexamethylene adipamide units in a molar ratio of the former units to the latter units of 40/60 and having a relative viscosity ($\eta_r$) of 1.8 with respect to 95.5% sulfuric acid and 20 parts by weight of a nylon 66 having a relative viscosity of 2.6 with respect to 95.5% sulfuric acid were blended together and extruded at a cylinder temperature of 285° C. using a twin-screw extruder (model PCM30 (manufactured and sold by Ikegai Corporation, Japan)) to obtain pellets. The pellets were subjected to solid-state polymerization in an atmosphere of nitrogen gas at 200° C. for 3 hours, thereby obtaining a copolyamide having a relative viscosity ($\eta_r$) of 2.4 with respect to 95.5% sulfuric acid. The melting temperature of the copolyamide was 272° C., and the heat of fusion of the copolyamide was 14 cal/g.

Example 1

100 Parts by weight of the copolyamide obtained in Referential Example 1 and 0.5 part by weight of a polycaprolactone (Placel® H-4 of about 40,000 in number average molecular weight, manufactured and sold by Daicel Chemical Industries, Ltd., Japan) were melted and blended together at 295° C. using the twin-screw extruder as used in Referential Example 11. Then, the resultant blend was injection-molded in substantially the same manner as mentioned before in connection with the determination of the mold release characteristics. The properties of the resultant cup-form article were determined, and the results are shown in Table 1.

Example 2

100 Parts by weight of the copolyamide obtained in Referential Example 2 and 5 parts by weight of a polycaprolactone (Placel® H-7 of about 70,000 in average molecular weight, manufactured and sold by Daicel Chemical Industries, Ltd., Japan) were melted and blended together at 300° C. using the same twin-screw extruder as used in Referential Example 11. Then, the resultant blend was injection-molded in substantially the same manner as mentioned before in connection with the determination of the mold release characteristics. The properties of the resultant article were determined, and the results are shown in Table 1.

Example 3

100 Parts by weight of the copolyamide obtained in Referential Example 3 and 2 parts by weight of a polycaprolactone (Placel® H-4 manufactured and sold by Daicel Chemical Industries, Ltd., Japan) were melted and blended together at 285° C. using the same twin-screw extruder as used in Referential Example 11. Then, the resultant blend was injection-molded in substantially the same manner as mentioned before in connection with the determination of the mold release characteristics. The properties of the resultant article were determined, and the results are shown in Table 1.

Example 4

Substantially the same procedure as in Example 3 was repeated except that 90 parts by weight of the copolyamide of Referential Example 3 and 10 parts by weight of a nylon 66 having a relative viscosity ($\eta_r$) of 2.9 with respect to 95.5% sulfuric acid were used in place of 100 parts by weight of the copolyamide of Referential Example 3, to thereby obtain an injection-molded article. The properties of the article were determined. The results are shown in Table 1.

Example 5

Substantially the same procedure as in Example 3 was repeated except that 80 parts by weight of the copolyamide of Referential Example 3 and 20 parts by weight of a nylon 66 having a relative viscosity ($\eta_r$) of 2.9 with respect to 95.5% sulfuric acid were used in place of 100 parts by weight of the copolyamide of Referential Example 3, to thereby obtain an injection-molded article. The properties of the article were determined. The results are shown in Table 1.

Example 6

100 Parts by weight of the copolyamide obtained in Referential Example 4 and 3 parts by weight of a polybutylene adipate (manufactured and sold by Sanken Chemical Co., Ltd., Japan; and having a number average molecular weight of about 4000) were melted and blended together at 300° C. using the same twin-screw extruder as used in Referential Example 11. Then, the resultant blend was injection-molded using an injection molding machine model IS50EP (manufactured and sold by Toshiba Machine Co., Ltd., Japan) at a cylinder temperature of 290° C., at a metal mold temperature of 80° C. and under an injection molding pressure of 40 kg/cm². The properties of the resultant article were determined, and the results are shown in Table 1.

Comparative Example 1

The copolyamide obtained in Referential Example 3 was injection-molded in substantially the same manner as in Example 1, and the properties of the injection-molded article were determined. The results are shown in Table 1.

Comparative Example 2

80 Parts by weight of the copolyamide obtained in Referential Example 3 and 20 parts by weight of a nylon 66 ($\eta_r$=2.9) were melted and blended together at 290° C. using the same extruder as in Example 1 to prepare pellets, and the pellets were injection-molded in substantially the same manner as in Example 1, and the properties of the obtained injection-molded article were determined. The results are shown in Table 1.

Comparative Example 3

80 Parts by weight of the copolyamide obtained in Referential Example 3, 20 parts by weight of a nylon 66 ($\eta_r$=2.9) and 15 parts by weight of a polycaprolactone (Placel® H-4, manufactured and sold by Daicel Chemical Industries, Ltd., Japan) were melted and blended together at 285° C. using the same extruder as in Example 1 to prepare pellets, and the pellets were injection-molded in substantially the same manner as in Example 1, and the properties of the injection-molded article were determined. The results are shown in Table 1.

Example 7

Substantially the same procedure as in Example 3 was repeated except that 50 parts by weight of the copolyamide of Referential Example 3 and 50 parts by weight of a nylon 66 having a relative viscosity ($\eta_r$) of 2.9 with respect to 95.5% sulfuric acid were used in place of 100 parts by weight of the copolyamide of Referential Example 3, to thereby obtain an injection-molded article. The properties of the article were determined. The results are shown in Table 1.

Comparative Example 4

100 Parts by weight of the copolyamide obtained in Referential Example 3 and 2 parts by weight of a caprolactone monomer (Placel ® M having a molecular weight of 114, manufactured and sold by Daicel Chemical Industries, Ltd., Japan) were melted and mixed at 285° C. using the same extruder as in Example 1 to obtain pellets. The pellets were injection-molded in substantially the same manner as in Example 1, and the mold release characteristics of the injection-molded article were examined. As a result, it was found that the mold release force was as high as 212 kg; that is, no improvement of mold release characteristics was obtained. Further, unfavorable silver streaks were observed on the surface of the article.

Comparative Example 5

100 Parts by weight of the copolyamide obtained in Referential Example 3 and 2 parts by weight of polybutylene terephthalate (Toray ® PBT1401 (XO6), manufactured and sold by Toray Industries, Inc., Japan) were melted and blended together at 285° C. using the same extruder as in Example 1 to obtain pellets. The pellets were injection-molded in substantially the same manner as in Example 1, and the mold release characteristics of the injection-molded article were examined. As a result, it was found that the mold release force was as high as 240 kg; that is, no improvement of mold release characteristics was obtained.

TABLE 1

| | | | Example 1 | Example 2 | Example 3 | Example 4 | Example 5 | Example 6 |
|---|---|---|---|---|---|---|---|---|
| formulation | aromatic ring-containing polyamide | type | 6T/66 (40/60) | 6T/6I (50/50) | 6T/66/612 (40/55/5) | 6T/66/612 (40/55/5) | 6T/66/612 40/55/5) | 6T/66/612 (45/40/15) |
| | | amount (pbw) | 100 | 100 | 100 | 90 | 80 | 100 |
| | aliphatic polyamide | type | | | | nylon 66 | nylon 66 | |
| | | amount (pbw) | | | | 10 | 20 | |
| | aliphatic polyester | type | Polycaprolactone (Placcel H-4) | Polycaprolactone (Placcel H-7) | Polycaprolactone (Placcel H-4) | Polycaprolactone (Placcel H-4) | Polycaprolactone (Placcel H-4) | polybutylene adipate |
| | | amount (pbw) | 0.5 | 5 | 2 | 2 | 2 | 3 |
| properties | flexural strength (kg/cm$^2$) | DRY sample | 1,290 | 1,400 | 1,260 | 1,230 | 1,200 | 1,330 |
| | | WET sample | 560 | 1,020 | 590 | 550 | 500 | 720 |
| | flexural modulus of elasticity (kg/cm$^2$) | DRY sample | 27,100 | 27,500 | 27,800 | 27,200 | 26,500 | 30,400 |
| | | WET sample | 11,200 | 28,000 | 13,500 | 12,800 | 11,200 | 16,800 |
| | Izod impact strength (kg · cm/cm) | DRY sample | 5.0 | 2 | 5.9 | 5.7 | 5.7 | 4.8 |
| | moisture content (%) (WET sample) | | 2.4 | 1.8 | 2.2 | 2.3 | 2.4 | 1.9 |
| molding properties | mold release characteristics (mold release force, kg) | | 40 | 35 | 43 | 40 | 35 | 42 |
| | moldability at continuous connector production (cooling time, seconds) | | 20 | 20 | 15 | 15 | 15 | 15 |

| | | | Comparative Example 1 | Comparative Example 2 | Comparative Example 3 | Example 7 |
|---|---|---|---|---|---|---|
| formulation | aromatic ring-containing polyamide | type | 6T/66/612 (40/55/5) | 6T/66/612 (40/55/5) | 6T/66/612 (40/55/5) | 6T/66/612 (40/55/5) |
| | | amount (pbw) | 100 | 80 | 80 | 50 |
| | aliphatic polyamide | type | | nylon 66 | nylon 66 | nylon 66 |
| | | amount (pbw) | | 20 | 20 | 50 |
| | aliphatic polyester | type | | | polycaprolactone (Placcel H-4) | polycaprolactone (Placcel H-4) |
| | | amount (pbw) | | | 15 | 2 |
| properties | flexural strength (kg/cm$^2$) | DRY sample | 1,290 | 1,240 | 1,020 | 1,150 |
| | | WET sample | 630 | 520 | 380 | 380 |
| | flexural modulus of elasticity (kg/cm$^2$) | DRY sample | 28,500 | · 27,000 | 22,000 | 27,200 |
| | | WET sample | 13,200 | 10.900 | 9,000 | 9,200 |
| | Izod impact strength (kg · cm/cm) | DRY sample | 5.5 | 5.4 | 5.2 | 4.8 |
| | moisture content (%) | | 2.1 | 2.3 | 2.6 | 4.8 |

| | | | | | | |
|---|---|---|---|---|---|---|
| molding properties | (WET sample) mold release characteristics (mold release force, kg) | 250 | 230 | 30 | 42 |
| | moldability at continuous connector production (cooling time, seconds) | 50 | 45 | 25 | 15 |

Example 8

90 Parts by weight of the copolyamide obtained in Referential Example 1, 10 parts by weight of a nylon 66 ($\eta_r$ 3.6), 15 parts by weight of an ionomer resin (HI-MILAN® 1855, manufactured and sold by Mitsui-Du Pont Polychemical, Ltd., Japan) and 1 part by weight of a polycaprolactone (Placel®H-4 manufactured and sold by Daicel Chemical Industries, Ltd., Japan) were melted and blended together at 295° C. using the same twin-screw extruder as used in Referential Example 11. Then, the resultant blend was injection-molded using an injection molding machine model PS40E (manufactured and sold by Nissei Plastic Industrial Co., Ltd., Japan) at a cylinder temperature of 290° C., at a mold temperature of 80° C. and under an injection molding pressure of 50 kg cm², to thereby obtain a test piece. The properties of the test piece were determined, and the results are shown in Table 2. As shown in Table 2, the test piece had excellent hinge effect characteristics, that is, the number of flexings (at −30° C.) was as high as 50. The other properties of the test piece are also excellent as shown in Table 2.

Example 9

90 Parts by weight of the copolyamide obtained in Referential Example 5, 10 parts by weight of a nylon 66 ($\eta_r$=3.6), 15 parts by weight of an ionomer resin (HI-MILAN®1706, manufactured and sold by Mitsui-Du Pont Polychemical, Ltd., Japan), 5 parts by weight of an ethylene-propylene rubber (Tafmer® PO180, manufactured and sold by Mitsui Petrochemical Industries, Ltd., Japan) and 1 part by weight of a polycaprolactone (Placel®H-4, manufactured and sold by Daicel Chemical Industries, Ltd., Japan) were melted and blended together in substantially the same manner as in Example 8, to obtain pellets. The pellets were injection-molded in substantially the same manner as in Example 8, and the properties of the resultant molded article were determined, and the results are shown in Table 2.

Example 10

Substantially the same procedure as in Example 9 was repeated except that 5 parts by weight of a hydrogenated polybutadiene (TUFTEC® manufactured and sold by Asahi Chemical Industry Co., Ltd., Japan) was used instead of 5 parts by weight of the ethylene-propylene rubber, to thereby obtain a molded article. The properties of the article were determined. The results are shown in Table 2.

Example 11

Substantially the same procedure as in Example 8 was repeated except that 1 part by weight of ethylene carbonate and 0.5 part by weight of glycerin were added to the materials used in Example 8 and HI-MILAN® 1706 was used instead of the HI-MILAN® 1855, to thereby obtain a molded article. The properties of the article were obtained. The results are shown in Table 2.

Example 12

Substantially the same procedure as in Example 11 was repeated except that 0.2 part by weight of talc was added to the materials used in Example 11 to thereby obtain a molded article. The properties of the article were determined. It was observed that the hardening time was shortened due to the incorporation of talc as a nucleator for crystallization, and that accordingly, the molding properties were improved. The results are shown in Table 2.

In Table 2, the properties of the articles were measured with respect to DRY samples.

TABLE 2

| | | | Example 8 | Comparative Example 6 | Example 9 |
|---|---|---|---|---|---|
| formulation | aromatic ring-containing polyamide | type | 6T/66 (40/60) | 6T/66 (40/60) | 6T/66 (40/60) |
| | | amount (pbw) | 90 | 90 | 90 |
| | aliphatic polyamide | type | nylon 66 ($\eta_r$ = 3.6) | nylon 66 ($\eta_r$ = 2.9) | nylon 66 ($\eta_r$ = 3.6) |
| | | amount (pbw) | 10 | 10 | 10 |
| | ionomer[*)1] resin | type | HI-MILAN 1855 | — | HI-MILAN 1706 |
| | | amount (pbw) | 15 | — | 15 |
| | rubber[*)2] | type | — | — | TAFMER PO 180 |
| | | amount (pbw) | — | — | 5 |
| | ethylene carbonate[*)3] | amount (pbw) | — | — | — |
| | glycerin[*)4] | amount (pbw) | — | — | — |
| | aliphatic polyester | type | Placcel H-4 | — | Placcel H-4 |
| | | amount (pbw) | 1 | — | 1 |
| | talc[*)5] | amount (pbw) | — | — | — |
| properties | tensile strength at yield (kg/cm²) | | 710 | 830 | 700 |
| | tensile elongation at break (%) | | 25 | 8 | 28 |
| | flexural modulus of elasticity (kg/cm²) | | 23,000 | 26,000 | 21,500 |
| | Izod impact strength (kg · cm/cm) | | 11 | 4.1 | 25 |
| | heat distortion temperature under 4.6 kg/cm² (°C.) | | 215 | 225 | 203 |
| molding properties | moldability into a small thickness | | very good | poor | very good |
| | hing effect properties (number of flexings) | | 50 | 30 | 130 |

TABLE 2-continued

|  |  |  | Example 10 | Example 11 | Example 12 |
|---|---|---|---|---|---|
| formulation | aromatic ring-containing polyamide | type<br>amount (pbw) | 6T/66 (40/60)<br>90 | 6T/66 (40/60)<br>90 | 6T/66 (40/60)<br>90 |
|  | aliphatic polyamide | type<br>amount (pbw) | nylon 66 ($\eta r = 3.6$)<br>10 | nylon 66 ($\eta r = 3.6$)<br>10 | nylon 66 ($\eta r = 3.6$)<br>10 |
|  | ionomer*)1 resin | type<br>amount (pbw) | HI-MILAN 1706<br>15 | HI-MILAN 1706<br>15 | HI-MILAN 1706<br>15 |
|  | rubber*)2 | type<br>amount (pbw) | TUF TEC<br>5 | —<br>— | —<br>— |
|  | ethylene carbonate*)3 | amount (pbw) | — | 1 | 1 |
|  | glycerin*)4 | amount (pbw) | — | 0.5 | 0.5 |
|  | aliphatic polyester | type<br>amount (pbw) | Placcel H-4<br>1 | Placcel H-4<br>1 | Placcel H-4<br>1 |
|  | talc*)5 | amount (pbw) | — | — | 1 |
| properties | tensile strength at yield (kg/cm$^2$) |  | 700 | 710 | 720 |
|  | tensile elongation at break (%) |  | 25 | 24 | 21 |
|  | flexural modulus of elasticity (kg/cm$^2$) |  | 21,000 | 23,000 | 22,500 |
|  | Izod impact strength (kg · cm/cm) |  | 21 | 18 | 16 |
|  | heat distortion temperature under 4.6 kg/cm$^2$ (°C.) |  | 202 | 216 | 210 |
| molding properties | moldability into a small thickness |  | very good | very good | very good |
|  | hing effect properties (number of flexings) |  | 115 | 155 | 150 |

Note
*)1 a carboxyl-containing ethylenic copolymer having pendant chains containing a carboxylic acid group and its metal salt
*)2 a carboxyl-free hydrocarbon copolymer consisting of carbon and hydrogen atoms
*)3 a carbonate
*)4 a polyhydric alcohol
*)5 a nucleator for crystallization

Examples 13 to 18

Substantially the same procedure as in Example 11 was repeated except that various types of aromatic ring-containing polyamides and aliphatic polyamides as shown in Table 3 were used, to thereby obtain molded articles. The properties of the articles were determined. The results are shown in Table 3. The hinge effect characteristics of the articles were excellent as shown in Table 3.

TABLE 3

|  | polyamide resin | | hinge effect properties (number of flexings) | moldability into a small thickness |
|---|---|---|---|---|
|  | aromatic ring-containing polyamide | aliphatic polyamide | | |
| Example 13 | Referential Example 6 | — | 119 | very good |
| Example 14 | Referential Example 7 | nylon 66 ($\eta_r = 3.6$) | 130 | " |
| Example 15 | Referential Example 8 | nylon 66 ($\eta_r = 3.6$) | 90 | " |
| Example 16 | Referential Example 9 | nylon 66 ($\eta_r = 3.6$) | 110 | " |
| Example 17 | Referential Example 10 | nylon 66 ($\eta_r = 3.6$) | 145 | " |
| Example 18 | Referential Example 11 | nylon 66 ($\eta_r = 3.6$) | 135 | " |

Example 19

48 Parts by weight of the copolyamide obtained in Referential Example 1, 12 parts by weight of a nylon 66 (hereinafter referred to as "Ny66") ($\eta_r = 2.9$, 40 parts by weight of poly(2,6-dimethyl-1,4-phenylene)ether (hereinafter referred to as "PPE") (sp/c=0.64 measured using chloroform as a solvent) and 0.5 part by weight of a polycaprolactone (hereinafter referred to as "PCL") (Placel®H-4 manufactured and sold by Daicel Chemical Industries, Ltd., Japan) were melted and blended together using a twin-screw extruder (PCM30 manufactured and sold by Ikegai Corporation, Japan), to thereby obtain pellets. Then, the pellets were injection-molded using an injection molding machine (model IS50EP manufactured and sold by Toshiba Machine Co., Ltd., Japan) to obtain a test piece. The properties of the test piece were determined, and the results are shown in Table 4.

Example 20

33 Parts by weight of the copolyamide of Referential Example 2, 27 parts by weight of Ny66, 40 parts by weight of PPE, and 5 parts by weight of polybutylene adipate (hereinafter referred to as "PBA") (manufactured and sold by Sanken Chemical Co., Ltd., Japan) were melted and blended together, followed by injection-molding in substantially the same manner as in Example 19, to thereby obtain an injection-molded article. The properties of the article were determined, and the results are shown in Table 4.

Example 21

70 Parts by weight of the copolyamide of Referential Example 3, 30 parts by weight of PPE and 2 parts by weight of PCL were melted and blended together, followed by injection-molding in substantially the same manner as in Example 19, to thereby obtain an injection-molded article. The properties of the article were determined, and the results are shown in Table 4.

Example 22

40 Parts by weight of the copolyamide of Referential Example 3, 10 parts by weight of Ny66, 50 parts by weight of PPE and 2 parts by weight of PCL were melted and blended together, followed by injection-molding in substantially the same manner as in Example 19, to thereby obtain an injection-molded article. The properties of the article were determined, and the results are shown in Table 4.

Example 23

72 Parts by weight of the copolyamide of Referential Example 3, 18 parts by weight of Ny66, 10 parts by weight of PPE and 2 parts by weight of PCL were melted and blended together, followed by injection-molding in substantially the same manner as in Example 19, to thereby obtain an injection-molded article. The properties of the article were determined, and the results are shown in Table 4.

Example 24

56 Parts by weight of the copolyamide of Referential Example 3, 14 parts by weight of Ny66, 30 parts by weight of PPE and 2 parts by weight of PCL were melted and blended together, followed by injection-molding in substantially the same manner as in Example 19, to thereby obtain an injection-molded article. The properties of the article were determined, and the results are shown in Table 4.

Comparative Example 7

56 Parts by weight of the copolyamide of Referential Example 3, 14 parts by weight of Ny66 and 30 parts by weight of PPE were melted and blended together, followed by injection-molding in substantially the same manner as in Example 19, to thereby obtain an injection-molded article. The properties of the article were determined, and the results are shown in Table 4.

Comparative Example 8

56 Parts by weight of the copolyamide of Referential Example 3, 14 parts by weight of Ny66, 30 parts by weight of PPE and 15 parts by weight of PCL were melted and blended together, followed by injection-molding in substantially the same manner as in Example 19, to thereby obtain an injection-molded article. The properties of the article were determined, and the results are shown in Table 4.

Comparative Example 9

24 Parts by weight of the copolyamide of Referential Example 3, 6 parts by weight of Ny66, 70 parts by weight of PPE and 2 parts by weight of PCL were melted and blended together, followed by injection-molding in substantially the same manner as in Example 19, to thereby obtain an injection-molded article. The properties of the article were determined, and the results are shown in Table 4.

Comparative Example 10

28 Parts by weight of the copolyamide of Referential Example 3, 42 parts by weight of Ny66, 30 parts by weight of PPE and 2 parts by weight of PCL were melted and blended together, followed by injection-molding in substantially the same manner as in Example 19, to thereby obtain an injection-molded article. The properties of the article were determined, and the results are shown in Table 4.

TABLE 4

| | | | Example 19 | Example 20 | Example 21 | Example 22 | Example 23 | Example 24 | Comparative Example 7 |
|---|---|---|---|---|---|---|---|---|---|
| formulation | aromatic ring-containing polyamide | type | 6T/66 (40/60) | 6T/6I (50/50) | 6T/66/612 (40/55/5) | 6T/66/612 (40/55/5) | 6T/66/612 (40/55/5) | 6T/66/612 (40/55/5) | 6T/66/612 (40/55/5) |
| | | amount (pbw) | 48 (80)*1 | 33 (55)*1 | 70 (100)*1 | 40 (80)*1 | 72 (80)*1 | 56 (80)*1 | 56 (80)*1 |
| | aliphatic polyamide | type | nylon 66 | nylon 66 | — | nylon 66 | nylon 66 | nylon 66 | nylon 66 |
| | | amount (pbw) | 12 (20)*2 | 27 (45)*2 | — | 10 (20)*2 | 18 (20)*2 | 14 (20)*2 | 14 (20)*2 |
| | aromatic polyether | type | PPE | PPE | PPE | PPE | PPE | PPE | PPE |
| | | amount (pbw) | 40 | 40 | 30 | 50 | 10 | 30 | 30 |
| | aliphatic polyester | type | PCL | PBA | PCL | PCL | PCL | PCL | — |
| | | amount (pbw) | 0.5 | 5 | 2 | 2 | 2 | 2 | — |
| properties | flexural strength (kg/cm$^2$) | DRY sample | 1,250 | 1,150 | 1,210 | 1,170 | 1,230 | 1,190 | 1,210 |
| | | WET sample | 720 | 760 | 720 | 870 | 620 | 700 | 730 |
| | flexural modulus of elasticity (kg/cm$^2$) | DRY sample | 26,900 | 27,600 | 26,500 | 26,000 | 27,300 | 26,200 | 26,600 |
| | | WET sample | 15,300 | 19,900 | 15,800 | 17,500 | 13,000 | 14,400 | 14,900 |
| | Izod impact strength (kg·cm/cm) | DRY sample | 4.0 | 2.9 | 4.1 | 3.7 | 5.2 | 4.8 | 4.0 |
| | moisture content (%) (WET sample) | | 1.9 | 2.2 | 1.8 | 1.7 | 2.1 | 2.0 | 1.9 |
| molding properties | mold release characteristics (mold release force, kg) | | 48 | 43 | 36 | 40 | 30 | 32 | 240 |
| | moldability at continuous connector production (cooling time seconds) | | 20 | 20 | 15 | 15 | 15 | 15 | 35 |

| | | | Comparative Example 8 | Comparative Example 9 | Comparative Example 10 |
|---|---|---|---|---|---|
| formulation | aromatic ring-containing polyamide | type | 6T/66/612 (40/55/5) | 6T/66/612 (40/55/5) | 6T/66/612 (40/55/5) |
| | | amount (pbw) | 56 (80)*1 | 24 (80)*1 | 28 (40)*1 |
| | aliphatic polyamide | type | nylon 66 | nylon 66 | nylon 66 |
| | | amount (pbw) | 14 (20)*2 | 6 (20)*2 | 42 (60)*2 |
| | aromatic polyether | type | PPE | PPE | PPE |
| | | amount (pbw) | 30 | 70 | 30 |
| | aliphatic polyester | type | PCL | PCL | PCL |
| | | amount (pbw) | 15 | 2 | 2 |
| properties | flexural strength | DRY sample | 980 | 1,170 | 1,120 |
| | | WET sample | 450 | 950 | 500 |

TABLE 4-continued

|  |  |  | | | |
|---|---|---|---|---|---|
|  | (kg/cm²) flexural modulus of elasticity (kg/cm²) | DRY sample WET sample | 21,500 10,100 | 27,000 20,000 | 26,800 10,200 |
|  | Izod impact strength (kg·cm/cm) | DRY sample | 5.0 | 1.8 | 5.1 |
|  | moisture content (%) (WET sample) |  | 2.3 | 1.0 | 2.4 |
| molding properties | mold release characteristics (mold release force, kg) |  | 30 | 52 | 28 |
|  | moldability at continuous connector production (cooling time seconds) |  | 15 | 15 | 15 |

Note
*)¹A numeral in parentheses means the content (% by weight) of the aromatic polyamide in the polyamide component.
*)²A numeral in parentheses means the content (% by weight) of the aliphatic polyamide in the polyamide component.

Example 25

100 Parts by weight of the copolyamide obtained in Referential Example 3 and 2 parts by weight of each of polycaprolactones (Placel ®, manufactured and sold by Daicel Chemical Industries, Ltd., Japan) having various molecular weights as shown in Table 5 were melted and blended together at 285° C. using a twin-screw extruder (model PCM30 manufactured and sold by Ikegai Corporation, Japan), to obtain pellets. The pellets were injection-molded in substantially the same manner as in Example 1, and the mold release characteristics of the injection-molded article were examined. The results are shown in Table 5.

TABLE 5

| aromatic ring-containing polyamide | type | 6T/66/612 (40/55/5) | 6T/66/612 (40/55/5) | 6T/66/612 (40/55/5) | 6T/66/612 (40/55/5) | 6T/66/612 (40/55/5) |
|---|---|---|---|---|---|---|
|  | amount (parts by weight) | 100 | 100 | 100 | 100 | 100 |
| aliphatic polyester | type | polycaprolactone (Placcel H-7) | polycaprolactone (Placcel H-1) | polycaprolactone (Placcel 240) | polycaprolactone (Placcel 230) | polycaprolactone (Placcel 208) |
|  | molecular weight | 70,000 to 100,000 | 10,000 | 4,000 | 2,000 | 830 |
|  | amount (parts by weight) | 2 | 2 | 2 | 2 | 2 |
| mold release characteristics (mold release force, kg) |  | 45 | 123 | 186 | 181 | 198 |

What is claimed is:
1. A polyamide composition consisting essentially of:
(A) 100 parts by weight of a polyamide consisting essentially of:
(a-1) 50 to 100% by weight, based on the total weight of components (a-1) and (a-2), of a hexamethylene terephthalamide unit-containing polyamide, and
(a-2) 0 to 50% by weight, based on the total weigh of components (a-1) and (a-2), of an aliphatic polyamide;
(B) 0.05 to 10 parts by weight of a polycaprolactone having a number average molecular weight of not smaller than 10,000;
(C) 0 to 35 parts by weight of a copolymer component consisting essentially of:
(c-1) 60 to 100% by weight, based on the total weight of components (c-1) and (c-2), of a carboxyl-containing ethylenic copolymer having pendant chains which contain a carboxylic acid group and a carboxylic acid metal salt group, and
(c-2) 0 to 40% by weight, based on the total weight of components (c-1) and (c-2), of a carboxyl-free hydrocarbon copolymer consisting essentially of carbon and hydrogen atoms;
(D) 0 to 10 parts by weight of a monomer component consisting essentially of:
(d-1) 40 to 80% by weight, based on the total weight of components (d-1) and (d-2), of an oxide, a carbonate or a mixture thereof,
said oxide and said carbonate being represented by the formula:

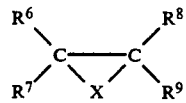

wherein each of $R^6$, $R^7$, $R^8$ and $R^9$ independently represents a hydrogen atom or an alkyl group having 1 to 3 carbon atoms; and X represents

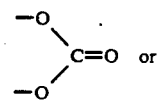

an oxygen atom, and
(d-2) 20 to 60% by weight, based on the total weight of components (d-1) and (d-2), of a polyhydric alcohol compound; and
(E) 0 to 150 parts by weight of an aromatic polyether.

2. The polyamide composition according to claim 1, wherein said polyamide resin (A) consists essentially of:
(a-1) 70 to 100% by weight, based on the total weight of components (a-1) and (a-2), of a hexamethylene terephthalamide unit-containing polyamide, and
(a-2) 0 to 30% by weight, based on the total weight of components (a-1) and (a-2), of an aliphatic polyamide, and wherein the amount of said aromatic polyether (E) is zero.

3. The polyamide composition according to claim 2, wherein said copolymer component (C) is present in an amount of from 3 to 35 parts by weight.

4. The polyamide composition according to claim 2, wherein the amount of each of said copolymer component (C) and said monomer component (D) is zero.

5. The polyamide composition according to claim 1, wherein the amount of each of said copolymer component (C) and said monomer component (D) is zero and wherein said aromatic polyether (E) is present in an amount of from 5 to 150 parts by weight.

6. The polyamide composition according to any one of claims 1 to 5, wherein said hexamethylene terephthalamide unit-containing polyamide (a-1) contains 20 to 60 mole %, based on the total number of moles of all the monomer units constituting said hexamethylene terephthalamide unit-containing polyamide (a-1), of hexamethylene terephthalamide units.

7. The polyamide composition according to claim 1, wherein said polyhydric alcohol compound is selected from the group consisting of ethylene glycol, trimethylene glycol, butanediol, diethylene glycol, glycerin and pentaerythritol.

* * * * *